US011481765B2

(12) United States Patent
Wang et al.

(10) Patent No.: US 11,481,765 B2
(45) Date of Patent: Oct. 25, 2022

(54) BLOCKCHAIN-BASED TRANSACTION PROCESSING METHOD AND APPARATUS AND ELECTRONIC DEVICE

(71) Applicant: Advanced New Technologies Co., Ltd., Grand Cayman (KY)

(72) Inventors: Jiyuan Wang, Hangzhou (CN); Xuebing Yan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/160,203

(22) Filed: Jan. 27, 2021

(65) Prior Publication Data

US 2021/0150519 A1 May 20, 2021

Related U.S. Application Data

(63) Continuation of application No. PCT/CN2019/103238, filed on Aug. 29, 2019.

(30) Foreign Application Priority Data

Oct. 25, 2018 (CN) .......................... 201811253444.0

(51) Int. Cl.
*G06Q 20/38* (2012.01)
*G06Q 20/06* (2012.01)
(Continued)

(52) U.S. Cl.
CPC ..... *G06Q 20/3821* (2013.01); *G06Q 20/0658* (2013.01); *G06Q 20/3829* (2013.01);
(Continued)

(58) Field of Classification Search
CPC ........... G06Q 20/3821; G06Q 20/0658; G06Q 20/3829; G06Q 20/401; G06Q 2220/00;
(Continued)

(56) References Cited

U.S. PATENT DOCUMENTS

| 2003/0041265 A1* | 2/2003 | Lagimonier | ........ H04W 12/121 |
| | | | 726/4 |
| 2007/0101412 A1* | 5/2007 | Yang | ..................... G06F 21/305 |
| | | | 726/5 |

(Continued)

FOREIGN PATENT DOCUMENTS

| CN | 106815722 | 6/2017 | |
| CN | 106815722 A * | 6/2017 | ............. G06Q 20/06 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Slade E Smith
(74) *Attorney, Agent, or Firm* — Fish & Richardson P.C.

(57) ABSTRACT

A plurality of transactions initiated by a user through a user account and need to be concurrently executed is received. A Nonce list corresponding to the user account and maintained in a blockchain is accessed. The Nonce list includes a plurality of Nonce records, and each Nonce record includes a group identifier and a Nonce value. Available Nonce records are obtained for the plurality of transactions from the Nonce list. The available Nonce records are respectively added to the plurality of transactions. The plurality of transactions are published in the blockchain, so that a node device in the blockchain matches the available Nonce record in a transaction published by the client device with the Nonce records in the Nonce list. When the available Nonce record matches a target Nonce record in the Nonce list, the node device processes the transaction, and concurrently executes a plurality of the processed transactions.

17 Claims, 6 Drawing Sheets

(51) Int. Cl.
  *H04L 9/06* (2006.01)
  *H04L 9/00* (2022.01)
(52) U.S. Cl.
  CPC .............. *H04L 9/0637* (2013.01); *H04L 9/50* (2022.05); *H04L 2209/56* (2013.01)
(58) Field of Classification Search
  CPC ........... G06Q 20/38215; G06Q 20/065; G06Q 20/308; G06Q 20/3674; G06Q 20/02; G06Q 20/3276; G06Q 20/3278; G06Q 20/407; G06Q 20/3825; G06Q 20/385; G06Q 40/12; G06Q 20/06; G06Q 20/10; G06Q 20/223; G06Q 20/3227; G06Q 20/36; G06Q 20/367; G06Q 20/3678; G06Q 20/382; G06Q 20/3823; G06Q 20/3827; G06Q 20/389; H04L 9/0637; H04L 2209/38; H04L 2209/56; H04L 9/3239; H04L 9/3236; H04L 9/3247; H04L 9/0861; H04L 9/14; H04L 9/30; H04L 9/3242; H04L 63/0435; H04L 63/0442; H04L 63/0492; H04L 63/061; H04L 63/0823; H04L 9/0891; H04L 9/3066; H04L 9/3271; H04L 63/102; H04L 67/104; H04L 9/0869; H04L 12/40; H04L 12/40189; H04L 2012/40215; H04L 2012/40273; H04L 63/0421; H04L 63/045; H04L 63/06; H04L 63/065; H04L 63/0876; H04L 63/12; H04L 63/123; H04L 63/1466; H04L 9/0643; H04L 9/0822; H04L 9/0825; H04L 9/0833; H04L 9/0894; H04L 9/3073; H04L 9/3218; H04L 9/3234; G06F 16/2379; G06F 21/64; G06F 16/00; G06F 16/2365; G06F 16/28; G06F 9/46; G06F 16/24552; G06F 21/51; G06F 21/602; G09C 1/00; H04W 4/70
  USPC .......................................................... 705/39
  See application file for complete search history.

(56) References Cited

U.S. PATENT DOCUMENTS

| | | | | |
|---|---|---|---|---|
| 2008/0077795 | A1* | 3/2008 | MacMillan | H04L 9/3236 713/169 |
| 2008/0148052 | A1* | 6/2008 | Lindsley | H04L 9/3263 713/169 |
| 2010/0275020 | A1* | 10/2010 | Aramaki | H04L 63/0869 713/170 |
| 2011/0029773 | A1* | 2/2011 | Effenberger | H04L 63/205 713/168 |
| 2014/0133656 | A1* | 5/2014 | Wurster | H04W 12/08 380/270 |
| 2016/0292672 | A1* | 10/2016 | Fay | G06Q 20/363 |
| 2017/0005804 | A1* | 1/2017 | Zinder | G06F 21/6254 |
| 2017/0011062 | A1* | 1/2017 | Zaveri | G06F 16/2379 |
| 2017/0149819 | A1* | 5/2017 | Androulaki | H04L 63/1441 |
| 2017/0212781 | A1* | 7/2017 | Dillenberger | G06F 9/5038 |
| 2017/0228731 | A1* | 8/2017 | Sheng | G06Q 20/36 |
| 2017/0251014 | A1* | 8/2017 | Eisen | G06F 11/3495 |
| 2017/0269186 | A1* | 9/2017 | Sharma | H04B 1/3833 |
| 2017/0316390 | A1* | 11/2017 | Smith | H04L 9/3239 |
| 2018/0253702 | A1* | 9/2018 | Dowding | H04L 9/3242 |
| 2018/0284755 | A1* | 10/2018 | Celia | G06N 5/046 |
| 2018/0293547 | A1* | 10/2018 | Randhawa | G06Q 10/1053 |
| 2018/0308094 | A1* | 10/2018 | Jayaram | G06Q 20/3827 |
| 2018/0359096 | A1* | 12/2018 | Ford | G06Q 20/29 |
| 2019/0013943 | A1* | 1/2019 | Maim | H04L 9/3218 |
| 2019/0050832 | A1* | 2/2019 | Wright | H04L 9/0841 |
| 2019/0066228 | A1* | 2/2019 | Wright | H04L 9/3066 |
| 2019/0103973 | A1* | 4/2019 | Chalkias | H04L 63/0442 |
| 2019/0123895 | A1* | 4/2019 | Blake | H04L 67/133 |
| 2019/0147532 | A1* | 5/2019 | Singh | H04L 9/3239 705/35 |
| 2019/0158470 | A1* | 5/2019 | Wright | G06Q 20/401 |
| 2019/0164150 | A1* | 5/2019 | Lee | G06Q 20/363 |
| 2019/0165930 | A1* | 5/2019 | Castinado | H04L 9/3239 |
| 2019/0188086 | A1* | 6/2019 | Maeda | G06F 16/2365 |
| 2019/0253524 | A1* | 8/2019 | Hoshizuki | G06F 16/2465 |
| 2019/0281036 | A1* | 9/2019 | Eisen | G06F 21/31 |
| 2019/0319798 | A1* | 10/2019 | Chalkias | H04L 9/3239 |
| 2019/0354076 | A1* | 11/2019 | Henson | A01G 9/243 |
| 2019/0370806 | A1* | 12/2019 | Wang | G06Q 20/382 |
| 2019/0378069 | A1* | 12/2019 | Deshpande | G06Q 10/067 |
| 2020/0007558 | A1* | 1/2020 | Inokuchi | H04L 9/3239 |
| 2020/0013050 | A1* | 1/2020 | Finlow-Bates | H04L 9/3239 |
| 2020/0021443 | A1* | 1/2020 | Falk | G06F 21/64 |
| 2020/0026785 | A1* | 1/2020 | Patangia | H04L 9/3239 |
| 2020/0044854 | A1* | 2/2020 | Hsueh | G06F 11/3409 |
| 2020/0052880 | A1* | 2/2020 | Bathen | H04L 9/14 |
| 2020/0052996 | A1* | 2/2020 | Zhu | H04L 43/50 |
| 2020/0067708 | A1* | 2/2020 | Subba | H04L 9/0861 |
| 2020/0082361 | A1* | 3/2020 | Chan | H04L 9/3247 |
| 2020/0090177 | A1* | 3/2020 | Brown | H04L 9/3239 |
| 2020/0106610 | A1* | 4/2020 | Doddavula | H04L 9/3213 |
| 2020/0117585 | A1* | 4/2020 | Falk | G06Q 20/382 |
| 2020/0119904 | A1* | 4/2020 | Philyaw | H04L 63/105 |
| 2020/0119936 | A1* | 4/2020 | Balasaygun | H04L 12/1831 |
| 2020/0136808 | A1* | 4/2020 | Chasko | H04L 9/3218 |
| 2020/0186336 | A1* | 6/2020 | Destefanis | H04L 9/0816 |
| 2020/0213125 | A1* | 7/2020 | Destefanis | G06Q 20/00 |
| 2020/0272618 | A1* | 8/2020 | Hughes | H04L 9/3236 |
| 2020/0278963 | A1* | 9/2020 | Destefanis | H04L 67/1093 |
| 2020/0293361 | A1* | 9/2020 | Falk | G06F 9/466 |
| 2020/0313884 | A1* | 10/2020 | Trevethan | H04L 9/085 |
| 2020/0374129 | A1* | 11/2020 | Dilles | H04L 9/50 |
| 2020/0387893 | A1* | 12/2020 | Maim | H04L 9/3247 |
| 2021/0021424 | A1* | 1/2021 | Punal | H04L 9/3236 |
| 2021/0081938 | A1* | 3/2021 | Falk | H04L 9/3247 |
| 2021/0090037 | A1* | 3/2021 | Dowding | G06Q 20/06 |

FOREIGN PATENT DOCUMENTS

| | | | |
|---|---|---|---|
| CN | 107688999 | 2/2018 | |
| CN | 107993147 | 5/2018 | |
| CN | 108053211 | 5/2018 | |
| CN | 108053211 A * | 5/2018 | ............ G06Q 20/06 |
| CN | 108075895 | 5/2018 | |
| CN | 108667632 | 10/2018 | |
| CN | 109598504 | 4/2019 | |
| TW | I517069 | 1/2016 | |
| WO | WO 2018/043865 | 3/2018 | |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2019/103238, dated Nov. 26, 2019, 9 pages.
Extended European Search Report in European Application No. 19874820.4. dated Aug. 13, 2021, 9 pages.
PCT International Preliminary Report on Patentability in International Application No. PCT/CN2019/103238, dated Apr. 27, 2021, 11 pages (with English translation).

* cited by examiner

| Group identifier | Index identifier | Nonce value | Available |
|---|---|---|---|
| XXX | XXX | XXX | T |
| XXX | XXX | XXX | T |
| XXX | XXX | XXX | F |
| XXX | XXX | XXX | F |

BLOCKCHAIN-BASED TRANSACTION PROCESSING METHOD AND APPARATUS AND ELECTRONIC DEVICE

CROSS-REFERENCE TO RELATED APPLICATIONS

This application is a continuation of PCT Application No. PCT/CN2019/103238, filed on Aug. 29, 2019, which claims priority to Chinese Patent Application No. 201811253444.0, filed on Oct. 25, 2018, and each application is hereby incorporated by reference in its entirety.

TECHNICAL FIELD

One or more embodiments of the present specification relate to the field of blockchain technologies, and in particular, to blockchain-based transaction processing methods and apparatuses and electronic devices.

BACKGROUND

A blockchain technology, also referred to as a distributed ledger technology, is an emerging technology in which several computing devices jointly participate in "bookkeeping" to maintain a complete distributed database. The blockchain technology features decentralization and transparency, each computing device can record data in the database, and the data can be synchronized rapidly between the computing devices. Therefore, the blockchain technology has been widely applied to many fields to build a decentralization system and to incorporate various execution programs into a distributed blockchain database for automatic execution.

SUMMARY

The present specification provides a blockchain-based transaction processing method, applied to a client device, where a Nonce list corresponding to a user account is maintained in a blockchain, the Nonce list includes a plurality of Nonce records, the Nonce record includes a group identifier and a Nonce value, and the method includes: obtaining, from the Nonce list, available Nonce records that include the same group identifier for a plurality of transactions that need to be concurrently executed and are initiated by a user through the user account; respectively adding the obtained available Nonce records to the plurality of transactions; and publishing the plurality of transactions in the blockchain, so that a node device in the blockchain matches an available Nonce record in a transaction published by the client device with the Nonce record in the Nonce list, and when the available Nonce record matches any target Nonce record in the Nonce list, processes the transaction, and concurrently executes a plurality of transactions with the same group identifier in processed transactions.

Optionally, the plurality of transactions that need to be concurrently executed include a plurality of transactions of the same transaction type.

Optionally, the method further includes: if transactions initiated by the user through the user account include a plurality of transaction groups and each transaction group includes a plurality of transactions that need to be concurrently executed, determining an execution order of the plurality of transaction groups; and obtaining available Nonce records that include the same group identifier for each of the plurality of transaction groups from the Nonce list, where group identifiers of the plurality of transaction groups indicate the execution order of the plurality of transaction groups.

Optionally, before the obtaining, from the Nonce list, available Nonce records that include the same group identifier for a plurality of transactions that need to be concurrently executed and are initiated by a user through the user account, the method further includes: in response to an initialization instruction for the client device, obtaining the Nonce list maintained in the blockchain, and maintaining the obtained Nonce list on the client device; and the obtaining, from the Nonce list, available Nonce records that include the same group identifier for a plurality of transactions that need to be concurrently executed and are initiated by a user through the user account includes: obtaining, from the Nonce list maintained on the client device, the available Nonce records that include the same group identifier for the plurality of transactions that need to be concurrently executed and are initiated by the user through the user account.

Optionally, the Nonce records in the Nonce list maintained on the client device are marked as available by default; and the method further includes: marking the available Nonce records as unavailable in the Nonce list after obtaining, from the Nonce list maintained on the client device, the available Nonce records that include the same group identifier for the plurality of transactions that need to be concurrently executed and are initiated by the user through the user account.

Optionally, the method further includes: determining whether a notification message indicating that the transaction is processed is received from the node device; and if yes, monotonically increasing a Nonce value in the available Nonce record based on predetermined amplitude, and re-marking the available Nonce record as available in the Nonce list after monotonically increasing the Nonce value.

Optionally, the client device is a multi-threaded client device, and a quantity of Nonce records in the Nonce list indicates a transaction concurrency capability of the user account.

Optionally, the Nonce record further includes an index identifier of the Nonce record.

The present specification further provides a blockchain-based transaction processing method, applied to a node device in a blockchain, where a Nonce list set is maintained in the blockchain, the Nonce list set includes Nonce lists corresponding to several user accounts, the Nonce list includes a plurality of Nonce records, the Nonce record includes a group identifier and a Nonce value, and the method includes: receiving a transaction that is initiated by a user through a user account and sent by a client device, where an available Nonce record obtained from a Nonce list that corresponds to the user account and is maintained in the blockchain is added to the transaction; matching the available Nonce record in the received transaction with a Nonce record in the Nonce list that corresponds to the user account and is maintained in the blockchain; and if the available Nonce record matches any target Nonce record in the Nonce list, processing the transaction, and concurrently executing a plurality of transactions with the same group identifier in processed transactions.

Optionally, transactions sent by the client device include a plurality of transaction groups, each transaction group includes a plurality of transactions with the same group identifier, and group identifiers in available Nonce records added by the client device to the plurality of transaction groups indicate an execution order of the plurality of transaction groups; and the method further includes: if the transactions sent by the client device include the plurality of transaction groups, and each transaction group includes a plurality of transactions with the same group identifier, executing the plurality of transaction groups in the execution order indicated by the group identifiers of the plurality of transaction groups.

Optionally, the method further includes: if the available Nonce record matches the any target Nonce record in the Nonce list, monotonically increasing a Nonce value in the target Nonce record based on predetermined amplitude; and returning a notification message indicating that the transaction is processed to the client device.

Optionally, the Nonce record further includes an index identifier of the Nonce record.

The present specification provides a blockchain-based transaction processing apparatus, applied to a client device, where a Nonce list corresponding to a user account is maintained in a blockchain, the Nonce list includes a plurality of Nonce records, the Nonce record includes a group identifier and a Nonce value, and the apparatus includes: an acquisition module, configured to obtain, from the Nonce list, available Nonce records that include the same group identifier for a plurality of transactions that need to be concurrently executed and are initiated by a user through the user account; an addition module, configured to respectively add the obtained available Nonce records to the plurality of transactions; and a publication module, configured to publish the plurality of transactions in the blockchain, so that a node device in the blockchain matches an available Nonce record in a transaction published by the client device with the Nonce record in the Nonce list, and when the available Nonce record matches any target Nonce record in the Nonce list, processes the transaction, and concurrently executes a plurality of transactions with the same group identifier in processed transactions.

Optionally, the plurality of transactions that need to be concurrently executed include a plurality of transactions of the same transaction type.

Optionally, the acquisition module is further configured to: if transactions initiated by the user through the user account include a plurality of transaction groups, and each transaction group includes a plurality of transactions that need to be concurrently executed, determine an execution order of the plurality of transaction groups; and obtain available Nonce records that include the same group identifier for each of the plurality of transaction groups from the Nonce list, where group identifiers of the plurality of transaction groups indicate the execution order of the plurality of transaction groups.

Optionally, the acquisition module is further configured to: before obtaining, from the Nonce list, the available Nonce records that include the same group identifier for the plurality of transactions that need to be concurrently executed and are initiated by the user through the user account, in response to an initialization instruction for the client device, obtain the Nonce list maintained in the blockchain, and maintain the obtained Nonce list on the client device; and obtain, from the Nonce list maintained on the client device, the available Nonce records that include the same group identifier for the plurality of transactions that need to be concurrently executed and are initiated by the user through the user account.

Optionally, the Nonce records in the Nonce list maintained on the client device are marked as available by default; and the acquisition module is configured to: mark the available Nonce records as unavailable in the Nonce list after obtaining, from the Nonce list maintained on the client device, the available Nonce records that include the same group identifier for the plurality of transactions that need to be concurrently executed and are initiated by the user through the user account.

Optionally, the acquisition module is further configured to: determine whether a notification message indicating that the transaction is processed is received from the node device; and if yes, monotonically increase a Nonce value in the available Nonce record based on predetermined amplitude, and re-mark the available Nonce record as available in the Nonce list after monotonically increasing the Nonce value.

Optionally, the client device is a multi-threaded client device, and a quantity of Nonce records in the Nonce list indicates a transaction concurrency capability of the user account.

Optionally, the Nonce record further includes an index identifier of the Nonce record.

The present specification further provides a blockchain-based transaction processing apparatus, applied to a node device in a blockchain, where a Nonce list set is maintained in the blockchain, the Nonce list set includes Nonce lists corresponding to several user accounts, the Nonce list includes a plurality of Nonce records, the Nonce record includes a group identifier and a Nonce value, and the apparatus includes: a receiving module, configured to receive a transaction that is initiated by a user through a user account and sent by a client device, where an available Nonce record obtained from a Nonce list that corresponds to the user account and is maintained in the blockchain is added to the transaction; a matching module, configured to match the available Nonce record in the received transaction with a Nonce record in the Nonce list that corresponds to the user account and is maintained in the blockchain; and an execution module, configured to: if the available Nonce record matches any target Nonce record in the Nonce list, process the transaction, and concurrently execute a plurality of transactions with the same group identifier in processed transactions.

Optionally, transactions sent by the client device include a plurality of transaction groups, each transaction group includes a plurality of transactions with the same group identifier, and group identifiers in available Nonce records added by the client device to the plurality of transaction groups indicate an execution order of the plurality of transaction groups; and the execution module is further configured to: if the transactions sent by the client device include the plurality of transaction groups, and each transaction group includes a plurality of transactions with the same group identifier, execute the plurality of transaction groups in the execution order indicated by the group identifiers of the plurality of transaction groups.

Optionally, the execution module is further configured to: if the available Nonce record matches the any target Nonce record in the Nonce list, monotonically increase a Nonce value in the target Nonce record based on predetermined amplitude; and return a notification message indicating that the transaction is processed to the client device.

Optionally, the Nonce record further includes an index identifier of the Nonce record.

The present specification further provides an electronic device, including: a processor; and a memory, configured to store a machine-executable instruction, where by reading and executing the machine-executable instruction that is stored in the memory and corresponds to blockchain-based transaction processing control logic, the processor is promoted to perform the following operations: obtaining, from a Nonce list that corresponds to a user account and is maintained in a blockchain, available Nonce records that include the same group identifier for a plurality of transactions that need to be concurrently executed and are initiated by a user through the user account, where the Nonce list includes a plurality of Nonce records, and the Nonce record includes a group identifier and a Nonce value; respectively adding the obtained available Nonce records to the plurality of transactions; and publishing the plurality of transactions in the blockchain, so that a node device in the blockchain matches an available Nonce record in a transaction published by the client device with the Nonce record in the Nonce list, and when the available Nonce record matches any target Nonce record in the Nonce list, processes the transaction, and concurrently executes a plurality of transactions with the same group identifier in processed transactions.

The present specification further provides an electronic device, including: a processor; and a memory, configured to store a machine-executable instruction, where by reading and executing the machine-executable instruction that is stored in the memory and corresponds to blockchain-based transaction processing control logic, the processor is promoted to perform the following operations: receiving a transaction that is initiated by a user through a user account and sent by a client device, where an available Nonce record obtained from a Nonce list that corresponds to the user account and is maintained in a blockchain is added to the transaction, the Nonce list includes a plurality of Nonce records, and the Nonce record includes a group identifier and a Nonce value; matching the available Nonce record in the received transaction with a Nonce record in the Nonce list that corresponds to the user account and is maintained in the blockchain; and if the available Nonce record matches any target Nonce record in the Nonce list, processing the transaction, and concurrently executing a plurality of transactions with the same group identifier in processed transactions.

In the technical solutions in the previous embodiments, a transaction concurrency capability of a single account on the client device can be improved while a replay attack on a transaction is alleviated.

DESCRIPTION OF EMBODIMENTS

A replay attack in the blockchain field refers to an attack behavior of publishing a repeated transaction, which causes the same transaction to be executed for a plurality of times, and causes a loss to a user.

For example, a classic "double spending" problem in a Bitcoin network is a typical replay attack. If a transfer transaction is intercepted by an unauthorized node after being approved by a signature of a user through a private key, the unauthorized node can initiate a replay attack based on the intercepted transaction after the transaction is executed. The transaction is repeatedly published and executed in the blockchain. Consequently, the transfer transaction is executed for a plurality of times, causing a financial loss to the user.

In some shown implementations, usually a densely increasing Nonce value (a densely increasing integer) can be added to a transaction to cope with the replay attack risk to the transaction.

Figure 1:
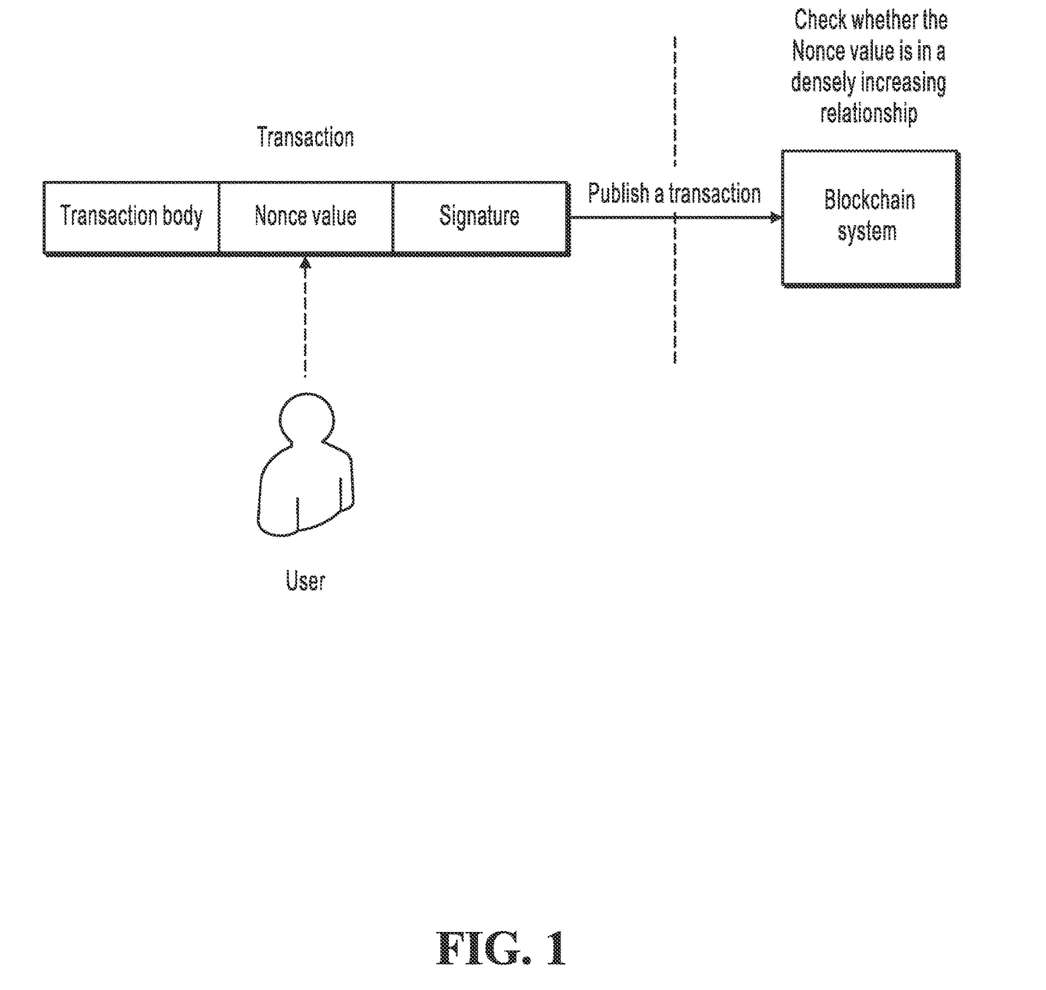
FIG. 1 is a schematic diagram illustrating performing replay attack detection for a transaction, according to an example embodiment.

FIG. 1 is a schematic diagram illustrating performing replay attack detection for a transaction, according to the present specification.

As shown in FIG. 1, a Nonce value can be specified for each transaction initiated by a user through a personal user account on a client device, and a signature can be added to a transaction body and the specified Nonce value of the transaction through a private key held by the user. The signature is an overall signature of [transaction body, Nonce value]. As such, it can be ensured that the Nonce value of the transaction cannot be tampered with.

After the signature is added, the client device can publish the transaction in a blockchain. After receiving the transaction, a node device in the blockchain needs to verify whether the signature of the transaction is valid, and further needs to detect whether the Nonce value of the transaction is in a densely increasing relationship with a Nonce value of the latest transaction that has been successfully processed. If the Nonce value of the transaction is in a densely increasing relationship with the Nonce value of the latest transaction that has been successfully processed, the transaction can be processed. Otherwise, the transaction can be considered as an invalid transaction.

For example, assume that the user initiates a transaction with a Nonce value of 1 on the client device through a personal user account, namely, Account 1. After the transaction is successfully processed in the blockchain, when the user initiates a new transaction on the client device through Account 1, a Nonce value of the transaction needs to be specified as 2, so that the transaction can be considered as a valid transaction by the node device in the blockchain for processing.

Correspondingly, a blockchain system maintains a Nonce status of the user account of the user. Each time a transaction initiated through Account 1 is successfully processed, the blockchain system increases the Nonce value corresponding to the user account by 1. After receiving a transaction published by the client device, the node device in the blockchain compares a Nonce value of the transaction with a Nonce value in the maintained Nonce status to determine whether the Nonce value of the transaction is exactly increased by 1 from a Nonce value of the latest transaction that has been successfully processed. If yes, the transaction can be processed.

As such, the replay attack risk to a transaction can be alleviated to some extent. However, for a user account, a next transaction can be initiated only after a current transaction is processed. Therefore, there is a shortfall in a transaction concurrency capability of a single account, and this method cannot be applied to a high-concurrency scenario.

In view of this, in the present specification, based on the previous replay attack protection solution, a technical solution that can improve a transaction concurrency capability of a single account on a client device is provided.

In implementation, a Nonce list set can be maintained in a blockchain. The Nonce list set can include Nonce lists corresponding to several user accounts. The Nonce list can include a plurality of Nonce records. Each Nonce record includes a group identifier and a Nonce value.

When a user initiates, through a personal user account on a client device, a plurality of transactions that need to be concurrently executed, the client device can obtain available Nonce records that include the same group identifier for the plurality of transactions from the Nonce list, respectively add the obtained available Nonce records to the plurality of transactions, and then publish the plurality of transactions in the blockchain.

After receiving a transaction sent by the client device, a node device in the blockchain can match an available Nonce record included in the transaction with the Nonce record in the Nonce list that corresponds to the user account and is maintained in the blockchain to perform replay attack detection for the transaction. If the available Nonce record matches any target Nonce record in the Nonce list, the replay attack detection for the transaction succeeds. In this case, the node device can process the transaction.

Further, the node device can determine again whether there are a plurality of transactions with the same group identifier in included Nonce records in all processed transactions. If yes, it indicates that the plurality of transactions need to be concurrently executed. In this case, the node device can concurrently execute the plurality of transactions with the same group identifier in the processed transactions. In the previous embodiment, the technical solution of adding the same group identifier to a plurality of transactions to trigger the node device in the blockchain to concurrently execute the plurality of transactions with the same group identifier is combined with the replay attack detection for the transaction. As such, a transaction concurrency capability of a single account on the client device can be improved while a replay attack on a transaction is alleviated.

The following describes the present specification by using specific embodiments and with reference to specific application scenarios.

Figure 2:
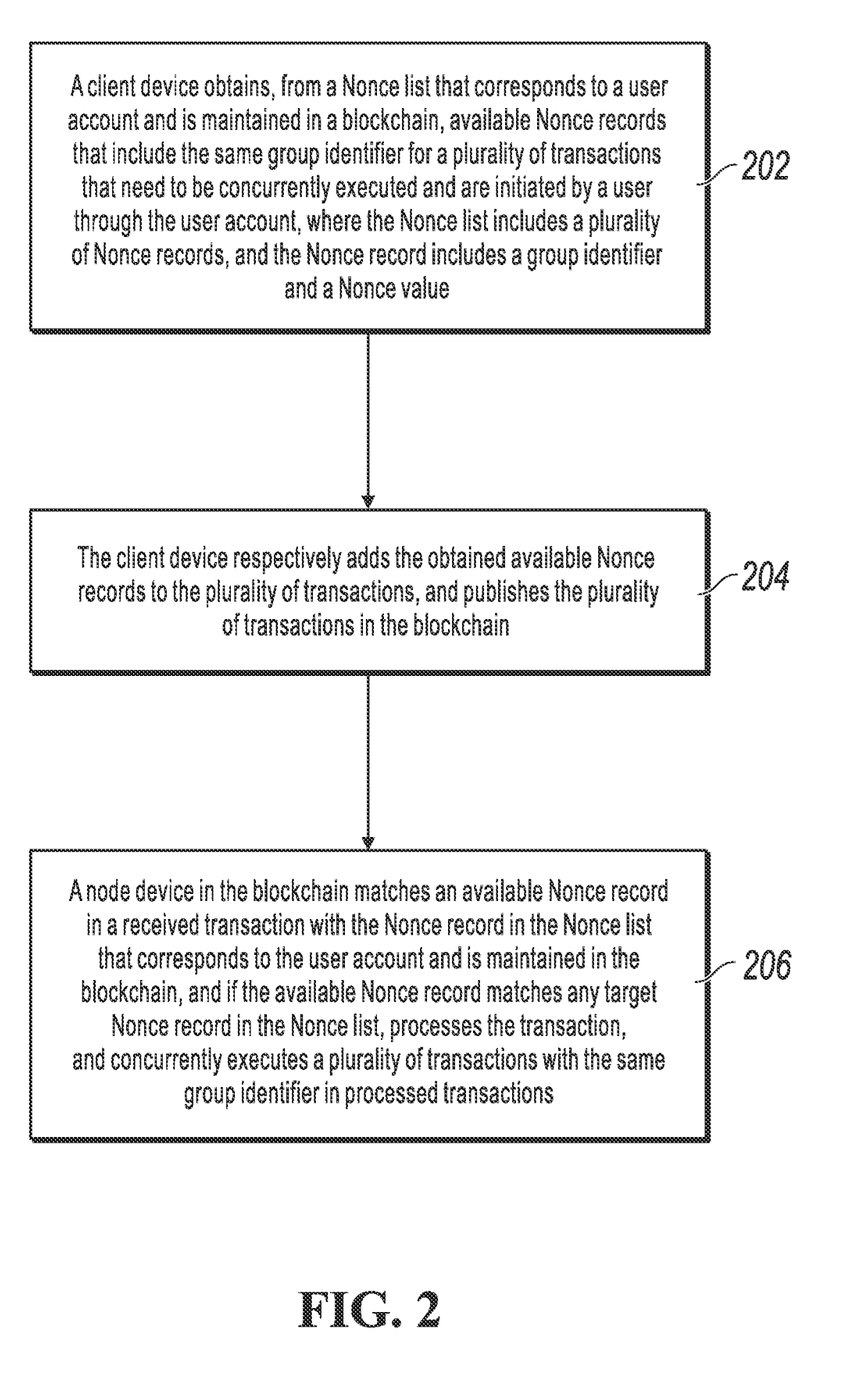
FIG. 2 is a flowchart illustrating a blockchain-based transaction processing method, according to an example embodiment.

FIG. 2 illustrates a blockchain-based transaction processing method, according to an embodiment of the present specification. The method includes the following steps.

Step 202: A client device obtains, from a Nonce list that corresponds to a user account and is maintained in a blockchain, available Nonce records that include the same group identifier for a plurality of transactions that need to be concurrently executed and are initiated by a user through the user account, where the Nonce list includes a plurality of Nonce records, and the Nonce record includes a group identifier and a Nonce value.

Step 204: The client device respectively adds the obtained available Nonce records to the plurality of transactions, and publishes the plurality of transactions in the blockchain.

Step 206: A node device in the blockchain matches an available Nonce record in a received transaction with the Nonce record in the Nonce list that corresponds to the user account and is maintained in the blockchain, and if the available Nonce record matches any target Nonce record in the Nonce list, processes the transaction, and concurrently executes a plurality of transactions with the same group identifier in processed transactions.

The blockchain described in the present specification can specifically include a private blockchain, a public blockchain, a consortium blockchain, etc. Implementations are not specifically limited in the present specification.

For example, in a scenario, the blockchain can be specifically a consortium blockchain that includes, as member devices, a server of a third-party payment platform, a domestic bank server, an overseas bank server, and several user node devices. An operator of the consortium blockchain can deploy online services such as cross-border transfer and asset transfer based on the consortium blockchain.

It is worthwhile to note that a transaction described in the present specification refers to a piece of data created by a user through a client device of the blockchain and needing to be eventually published in a distributed database of the blockchain.

Transactions in the blockchain are usually classified into a transaction in a narrow sense and a transaction in a broad sense. The transaction in a narrow sense refers to a value transfer published by a user in the blockchain. For example, in a conventional Bitcoin blockchain network, a transaction can be a transfer initiated by a user in the blockchain. The transaction in a broad sense refers to service data with a service intention published by a user in the blockchain. For example, the operator can build a consortium blockchain based on actual service needs, and deploy some other types of online services (for example, anti-counterfeiting services, house rental services, vehicle scheduling services, insurance claims services, credit services, and medical services) that are irrelevant to value transfer based on the consortium blockchain. In this type of consortium blockchain, a transaction can be a service message or a service request with a service intention published by a user in the consortium blockchain.

In the present specification, the client device can be specifically a multi-threaded client device. That is, the client device can simultaneously enable a plurality of threads, and each thread can run independently. As such, the user can simultaneously initiate a plurality of transactions through the personal user account and by invoking the plurality of threads of the client device.

When the client device receives the plurality of transactions initiated by the user through the user account, it can be determined whether the transactions initiated by the user through the user account include a plurality of transactions that need to be concurrently executed.

In the present specification, the plurality of transactions that need to be concurrently executed can include any type of transactions, there is no strict transaction execution order between the transactions, and the transactions can be concurrently processed and executed.

For example, if execution of a transaction requires an execution result of another transaction as an input, the two transactions cannot be concurrently processed and executed.

On the contrary, if there is no such data dependency between two transactions, the two transactions can be concurrently processed and executed.

In implementation, the plurality of transactions that need to be concurrently executed can be specified by the user in a process of initiating transactions through the user account.

For example, in some shown implementations, after initiating many transactions, the user can manually specify, based on needs through a user interface provided by the client device, the plurality of transactions that need to be concurrently executed.

In practice, the plurality of transactions that need to be concurrently executed can be dynamically confirmed by the client device based on a predetermined concurrent processing rule.

Specific content of the concurrent processing rule is not particularly limited in the present specification. In practice, a person skilled in the art can flexibly define the concurrent processing rule based on actual concurrent processing needs.

For example, in some shown implementations, the concurrent processing rule can be a rule for "concurrently executing transactions of the same transaction type".

In this case, after receiving many transactions initiated by the user, the client device can further check specific transaction types of these transactions, and then determine a plurality of transactions of the same transaction type as transactions that need to be concurrently executed. For example, if transaction types supported by the blockchain include a transaction type used to create an account and a transaction type used to implement a transfer, the client device can determine the transaction type used to create an account and the transaction type used to implement a transfer in the many transactions initiated by the user, and then determine a plurality of transactions corresponding to the two transaction types as transactions that need to be concurrently executed.

Certainly, in practice, in addition to the rule for "concurrently executing transactions of the same transaction type", the concurrent processing rule can be other forms of concurrent processing rule. Implementations are not listed one by one in the present specification.

In the present specification, a Nonce list set can be maintained in the blockchain. The Nonce list set can include Nonce lists corresponding to several user accounts. Each of the Nonce lists can include a plurality of Nonce records. Each Nonce record can include an auxiliary parameter and a Nonce value.

That is, in the present specification, the Nonce record can be specifically a composite structure that includes a plurality of fields including the Nonce value.

In implementation, the operator of the blockchain can allocate an available Nonce value to each user account in advance, set a corresponding auxiliary field for each Nonce value based on the allocated available Nonce value, and then construct a plurality of Nonce records based on each available Nonce value and the corresponding auxiliary field.

Then, a Nonce list can be constructed for the user account based on the plurality of generated Nonce records. Finally, the Nonce list set can be created based on the Nonce list constructed for each user account, and the Nonce list set can be published in the blockchain. Consensus processing can be performed by the node device in the blockchain, and after a consensus is reached, the Nonce list set can be stored in a distributed database of the blockchain for storage and maintenance.

It is worthwhile to note that specific parameter content of the auxiliary parameters is not particularly limited in the present specification. In practice, the auxiliary parameter can specifically include any form of parameter obtained by the operator of the blockchain through extension based on the available Nonce value of the user account and actual needs, or a combination of parameters.

That is, in practice, a quantity and a type of parameters that can be included in the auxiliary parameter may not be fixed. Any parameter can be obtained as the auxiliary parameter through extension based on the Nonce value. A plurality of parameters can be obtained through extension based on the Nonce value, and are combined as the auxiliary parameter.

In the present specification, the auxiliary parameter in the Nonce record in the Nonce list can specifically include a group identifier. The group identifier is specifically used to indicate a group that a transaction belongs to, and transactions that belong to the same group are transactions that need to be concurrently executed. A Nonce list corresponding to each user account in the Nonce list set can include a plurality of Nonce records that include the same group identifier. As such, when the user initiates, through the personal user account, a plurality of transactions that need to be concurrently executed, the client device can obtain Nonce records that include the same group identifier for the plurality of transactions from the Nonce list.

In some shown implementations, in addition to the group identifier, the auxiliary parameter in the Nonce record in the Nonce list can include an index identifier (for example, an index number) of the Nonce record. The index identifier is specifically used to indicate a rank and a location of the Nonce record in the Nonce list.

Figure 3:
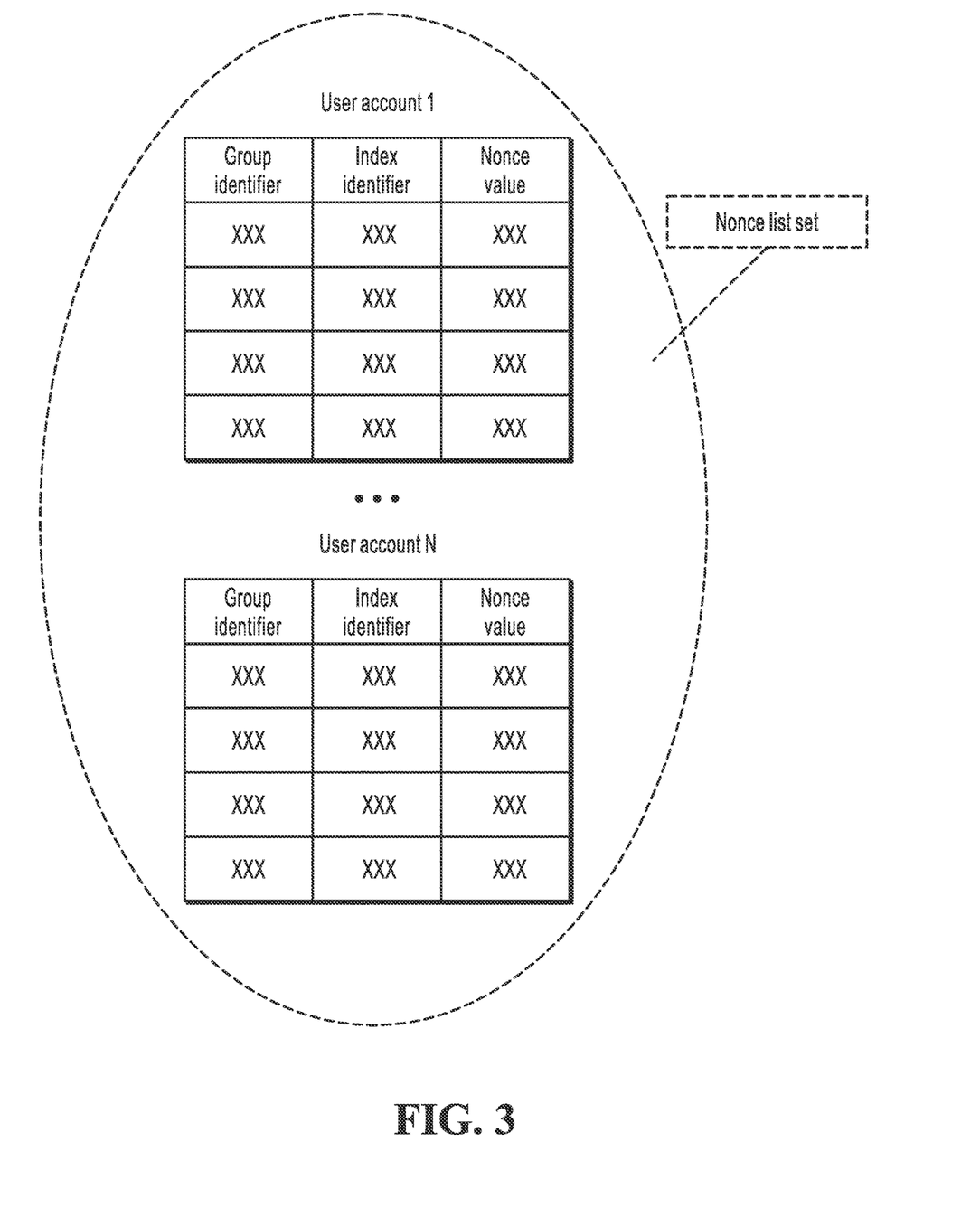
FIG. 3 is a schematic structural diagram of a Nonce list set maintained in a blockchain, according to an example embodiment.

For example, referring to FIG. 3, the auxiliary parameter in the Nonce record in the Nonce list includes both the group identifier and the index identifier of the Nonce record. In this case, the Nonce record can be specifically a composite structure including fields such as the group ID (group identifier), the index (index identifier), and the value (Nonce value). In this case, the Nonce list set maintained in the blockchain can be represented in a form shown in FIG. 3.

Specific byte lengths of the Nonce record, the Nonce value and the auxiliary parameter in the Nonce record are not particularly limited in the present specification. In practice, the byte lengths can be flexibly set based on an actual needs of the operator of the blockchain (for example, the operator can control specific value ranges of the Nonce value and the auxiliary parameter by using the occupied byte lengths).

For example, in some implementations, the Nonce record can be specifically a 16-byte composite structure. Four bytes represents the group ID (group identifier), four bytes represents the index (index identifier), and eight bytes represents the value (Nonce value).

A plurality of parameters are obtained through extension based on the Nonce value, and are combined as the auxiliary parameter, so that the Nonce record in the Nonce table can cover various value fields, to reduce the probability that the plurality of Nonce records in the Nonce list conflict with each other due to the same value.

For example, the probability that two 12-byte Nonce records that include the group ID (group identifier) and the value (Nonce value) are identical and conflict with each other is far lower than the probability that two 16-byte Nonce records that include the group ID (group identifier), the index (index identifier), and the value (Nonce value) are identical and conflict with each other.

Figure 4:
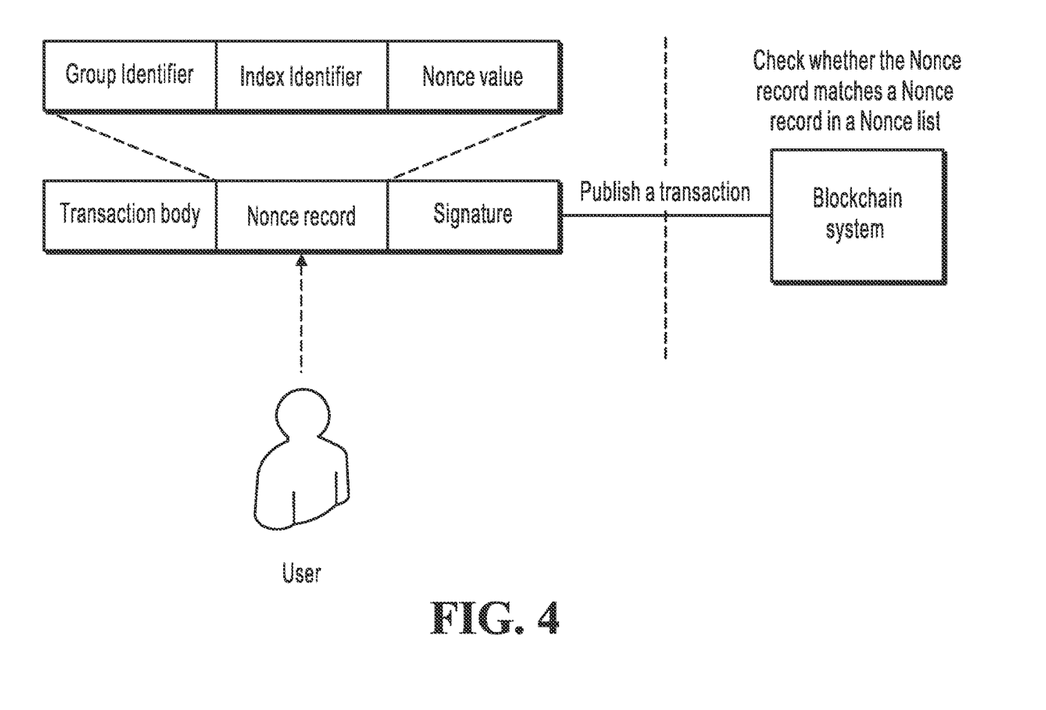
FIG. 4 is another schematic diagram illustrating performing replay attack detection for a transaction, according to an example embodiment.

Referring to FIG. 4, when the user initiates, on the client device through the personal user account and by invoking the plurality of threads enabled on the client device, a plurality of transactions that need to be concurrently executed, the client device can obtain available Nonce records that include the same group identifier for the plurality of transactions from the Nonce list that corresponds to the user account and is maintained in the blockchain (that is, add the same group identifier to the plurality of transactions).

The Nonce list includes a plurality of Nonce records, and therefore the plurality of threads enabled on the client device can obtain available Nonce records for initiated transactions from the Nonce list. As such, the user can simultaneously initiate a plurality of transactions through the client device through the personal user account. Therefore, in the present specification, a quantity of Nonce records in above Nonce list can be actually used to indicate a transaction concurrency capability of the personal user account of the user. For example, if the Nonce list includes four Nonce records, the user can simultaneously initiate four transactions through the user account.

Based on this, in practice, the operator of the blockchain can flexibly specify the quantity of Nonce records included in the Nonce list based on performance of the client device. Alternatively, the client device can actively report performance of the client device to a blockchain system, and the operator of the blockchain can flexibly specify the quantity of Nonce records included in the Nonce list.

For example, if it is determined, based on the performance of the client device, that the client device can simultaneously enable four threads to initiate a transaction, four available Nonce records can be added to the Nonce list when the Nonce list is created for the user account logged in to the client device.

In some shown implementations, in an initialization phase, the client device can "download" the Nonce list maintained in the blockchain in advance for maintenance.

For example, in implementation, when the client device is started for running, or when the client device is disconnected from the node device in the blockchain, and needs to be reconnected to the node device, an initialization operation is needed. In this case, when receiving an initialization instruction (for example, a start instruction or a reconnection instruction) for the client device that is triggered by the user, the client device can establish a connection to the node device in the blockchain in response to the initialization instruction, access the distributed database of the blockchain based on the connection, obtain the Nonce list maintained in the blockchain, and then locally store and maintain the obtained Nonce list.

In this case, when needing to obtain the available Nonce records that include the same group identifier for the plurality of transactions, the client device can directly obtain the available Nonce records from the locally maintained Nonce list.

In this way, no data exchange needs to be performed with the node device in the blockchain, and data is read from the Nonce list maintained in the blockchain to obtain the available Nonce record for the target transaction. As such, processing performance of the client device can be improved.

In practice, transactions initiated by the user through the user account can include a plurality of transaction groups, each transaction group includes a plurality of transactions that need to be concurrently executed, and the plurality of transaction groups can be executed in a specific order. In this case, if the transactions initiated by the user through the user account include the plurality of transaction groups, and each transaction group includes a plurality of transactions that need to be concurrently executed, the client device can further determine the execution order of the plurality of transaction groups.

The execution order of the plurality of transaction groups can be manually defined by the user, or can be dynamically confirmed by the client device based on an actual service procedure. Implementations are not specifically limited in the present specification.

Further, after determining the execution order of the plurality of transaction groups, the client device needs to add the same group identifier to the plurality of transactions included in each of the plurality of transaction groups, and further needs to ensure that group identifiers added to transactions included in the plurality of transaction groups can indicate the execution order of the plurality of transaction groups.

In this case, the Nonce list needs to include a plurality of Nonce record groups indicating the same group identifier for transactions in the same transaction group and a different group identifier for a different transaction group. In other words, transactions in the same transaction group have the same group identifier, and a transaction in a different transaction group has a different group identifier. As such, the available Nonce records that include the same group identifier can be obtained for the transactions in each of the plurality of transaction groups, and the group identifiers of the plurality of transaction groups indicate the execution order of the plurality of transaction groups. The group identifiers are used to indicate the execution order of the plurality of transaction groups, which can be specifically implemented by adding group identifiers that are in a monotonically increasing relationship to the plurality of transaction groups.

For example, the transactions initiated by the user through the user account include two transaction groups, namely, {A1, B1, C1} and {A2, B2, C2}, and each transaction group includes transactions that need to be concurrently executed. In this case, the client device can obtain available Nonce records that include the same group identifier 1 for transactions A1, B1, and C1 from the Nonce list, obtain available Nonce records that include the same group identifier 2 for transactions A2, B2, and C2, and indicate, by using a monotonically increasing relationship between the group identifiers, that the transaction group {A1, B1, C1} needs to be executed before the transaction group {A2, B2, C2}. That is, the execution order of the transaction groups is consistent with an ascending order of the added transaction identifiers.

In some shown implementations, for the Nonce list maintained on the client device, a mark indicating "available" can be added by default by the client device to the Nonce records in the Nonce list.

Figure 5:
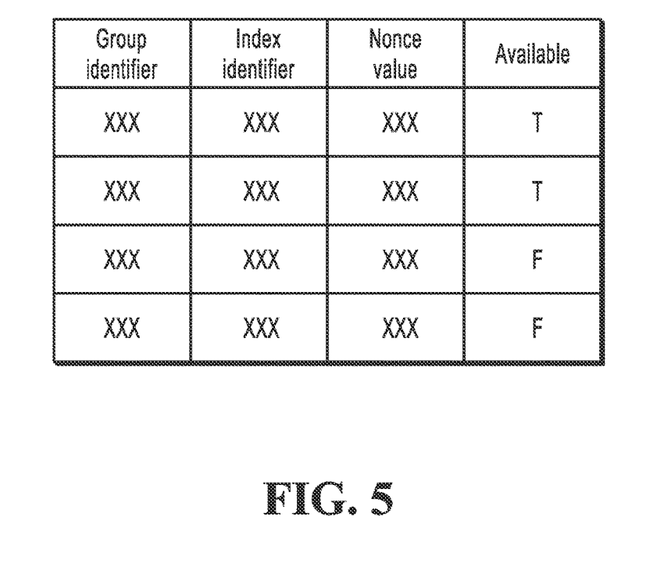
FIG. 5 is a schematic structural diagram of a Nonce list maintained in a client device, according to an example embodiment.

For example, referring to FIG. 5, the Nonce record is the 16-byte composite structure shown in FIG. 4, and a 1-byte available field can be obtained through extension for the Nonce record in the Nonce list. When a value of the available field is T, it indicates that the Nonce record is "available". When the value of the available field is F, it indicates that the Nonce record is "unavailable".

When the threads enabled on the client device obtain the available Nonce records for the plurality of transactions initiated by the user from the Nonce list maintained on the client device, a plurality of Nonce records that include the same group identifier can be randomly selected as the available Nonce records from all Nonce records that are marked as "available" in the Nonce list.

In addition, after the threads enabled on the client device obtain the available Nonce records for the plurality of transactions initiated by the user from the Nonce list maintained on the client device, marks included in the Nonce records can be modified and updated, and marks indicating "unavailable" can be added to the available Nonce records, to mark the available Nonce records as unavailable.

In the present specification, after obtaining the available Nonce records for the plurality of transactions that need to be concurrently executed and are initiated by the user, the client device can add the obtained available Nonce records to the plurality of transactions.

For example, referring back to FIG. 4, after obtaining the available Nonce record for the transaction, the client device can package a transaction body of the transaction and the available Nonce record, and then prompt the user to add an overall signature to the packaged [transaction body, Nonce record] based on a held private key. As such, it can be ensured that the Nonce record in the transaction cannot be tampered with.

Further, after the client device adds the obtained available Nonce records to the plurality of transactions, the client device can publish the plurality of transactions in the blockchain.

For example, the client device publishes the plurality of transactions to the node device accessed by the client device, or publishes the plurality of transactions in the blockchain through broadcasting. A specific way of publishing the plurality of transactions in the blockchain by the client device usually depends on a consensus mechanism used in the blockchain. Implementations are not particularly limited in the present specification.

When receiving the transaction published by the client device, the node device in the blockchain can first initiate consensus processing for the received transaction based on a consensus algorithm used in the blockchain.

The consensus algorithm used in the blockchain and a consensus processing process for the target transaction based on the consensus algorithm are not described in detail in the present specification for simplicity. A person skilled in the art can refer to description of related technologies when implementing the technical solutions described in the present specification.

When a consensus on the received transaction is reached, the node device in the blockchain can further initiate validity detection for the received transaction.

In the present specification, the validity detection for the transaction can include at least validity detection for the signature included in the transaction and replay attack detection for the transaction.

In implementation, the node device in the blockchain can first verify the signature of the received transaction based on a public key corresponding to the private key held by the user. If verification on the signature of the transaction fails, the transaction can be considered as an invalid transaction, and the node device can directly return, to the user through the client device, a prompt message indicating a transaction execution failure.

If verification on the signature of the transaction succeeds, the node device can further perform replay attack detection for the transaction based on the available Nonce records included in the target transaction and the Nonce list that corresponds to the user account of the user and is maintained in the blockchain.

Referring back to FIG. 4, the node device can match the Nonce record included in the transaction with each Nonce record in the Nonce list that corresponds to the user account and is maintained in the blockchain. If the Nonce record included in the transaction matches the any target Nonce record in the Nonce list, it can be determined that the replay attack detection for the transaction succeeds. In this case, the node device can process the transaction.

In addition, after the transaction is processed, the node device can monotonically increase a Nonce value in the target Nonce record based on predetermined amplitude. The predetermined amplitude can be customized based on actual needs.

For example, the predetermined amplitude can still be 1, and the node device can increase the Nonce value in the matched target Nonce record in the Nonce list by 1 after the transaction is processed.

In this way, if the transaction is repeatedly published in the blockchain after being processed, no corresponding Nonce record can be matched for the repeatedly published transaction from the Nonce list because the Nonce value in the target Nonce record that matches the available Nonce record included in the transaction in the Nonce list has been updated. Therefore, the repeatedly published transaction will not be processed again. As such, a replay attack initiated by repeatedly publishing the transaction in the blockchain can be effectively alleviated.

In some shown implementations, after the transaction is processed, a notification message indicating that the transaction is processed can be returned to the client device. After publishing the transaction initiated by the user through the personal user account in the blockchain, the client device can determine whether the notification message indicating that the transaction is processed is received from the node device.

If the client device determines that the notification message indicating that the transaction is processed is received, the client device can monotonically increase, based on the predetermined amplitude, the Nonce value in the available Nonce record obtained for the initiated transaction from the Nonce list maintained on the client device. For example, the client device increases the Nonce value in the available Nonce record by 1 to maintain content synchronization with the Nonce list maintained in the blockchain.

In addition, the available Nonce record has previously been marked as "unavailable". Therefore, after monotonically increasing the Nonce value in the available Nonce record based on the predetermined amplitude, the client device can set the value of the available field in the available Nonce record to "T".

In the present specification, after all transactions that are initiated by the user and sent by the client device are processed, a node device in the blockchain can further determine whether there are a plurality of transactions with the same group identifier in the processed transactions sent by the client device.

If there are a plurality of transactions with the same group identifier in the processed transactions, the node device in the blockchain can concurrently execute the plurality of transactions, and store the plurality of transactions and execution results of the plurality of transactions in the distributed database of the blockchain after executing the plurality of transactions.

Correspondingly, the transactions sent by the client device include a plurality of transaction groups, each transaction group includes a plurality of transactions with the same group identifier, and group identifiers in available Nonce records added by the client device to the plurality of transaction groups indicate an execution order of the plurality of transaction groups. In this case, after receiving the transactions that are sent by the client device and to which the group identifier is added, and determining that the transactions sent by the client device include the plurality of transaction groups, and each transaction group includes a plurality of transactions with the same group identifier, the node device in the blockchain can execute the plurality of transaction groups in the execution order indicated by the group identifiers of the plurality of transaction groups.

For example, the transactions initiated by the user through the user account include two transaction groups, namely, {A1, B1, C1} and {A2, B2, C2}, and each transaction group includes transactions that need to be concurrently executed. In addition, the client device adds available Nonce records that include the same group identifier 1 for transactions A1, B1, and C1, and adds available Nonce records that include the same group identifier 2 for transactions A2, B2, and C2. In this case, after transactions A1, B1, C1, A2, B2, and C2 are all processed, the node device in the blockchain concurrently executes transactions A1, B1, and C1 in the transaction group whose group identifier is 1, and then concurrently executes transactions A2, B2, and C2 in the transaction group whose group identifier is 2.

In the previous solution, the technical solution of adding the same group identifier to a plurality of transactions to trigger the node device in the blockchain to concurrently execute the plurality of transactions with the same group identifier is combined with the replay attack detection for the transaction. As such, a transaction concurrency capability of a single account on the client device can be improved while a replay attack on a transaction is alleviated.

Figure 6:
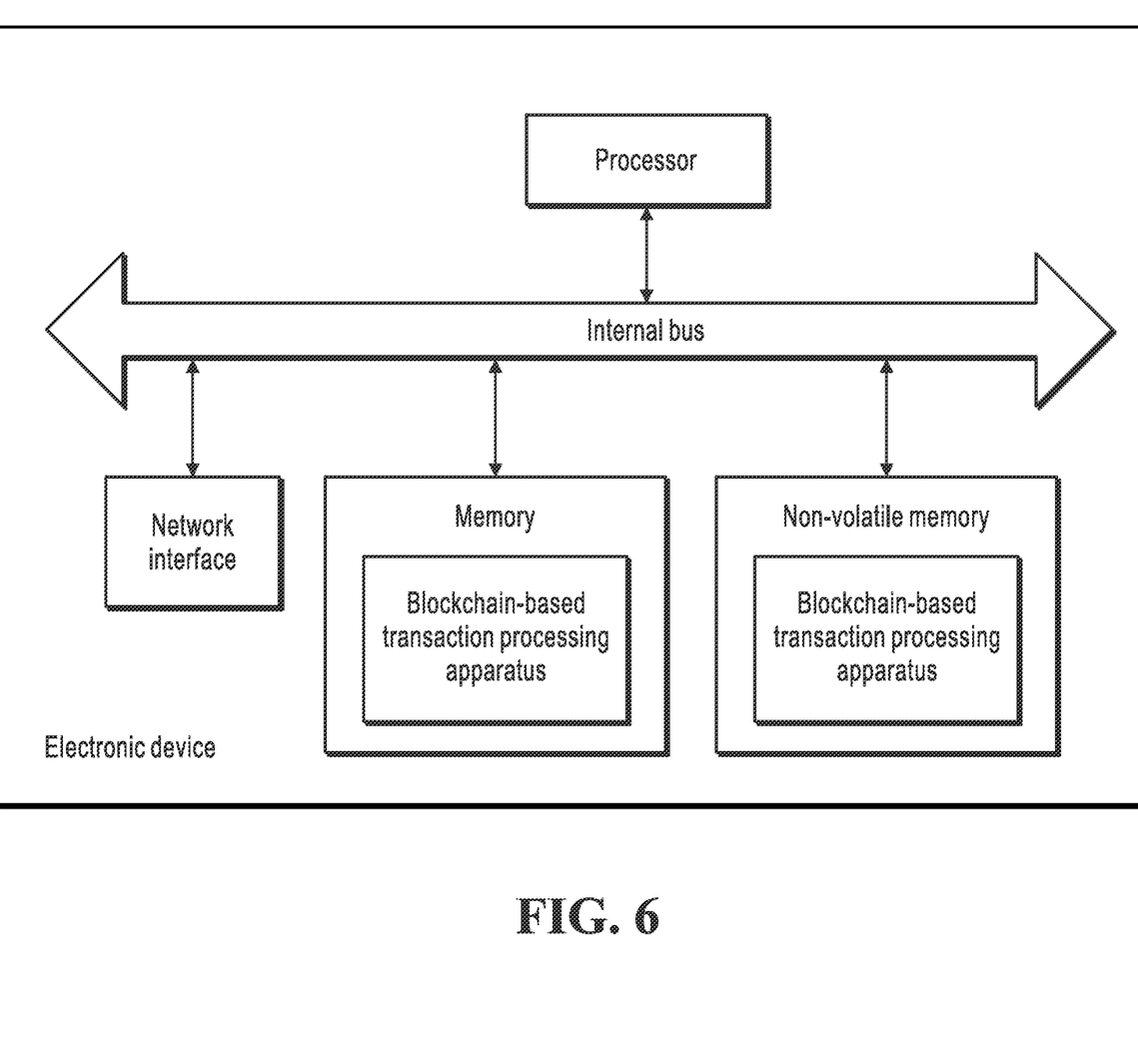
FIG. 6 is a schematic structural diagram of an electronic device, according to an example embodiment.

Corresponding to the previous method embodiments, the present specification further provides embodiments of a blockchain-based transaction processing apparatus. The embodiments of the blockchain-based transaction processing apparatus in the present specification can be applied to an electronic device. The apparatus embodiments can be implemented by software, or can be implemented by hardware or a combination of software and hardware. Software implementation is used as an example. As a logical apparatus, the apparatus is formed by reading a corresponding computer program instruction from a nonvolatile memory by a processor of the electronic device in which the apparatus is located and running the instruction in a memory. In terms of hardware, FIG. 6 is a diagram illustrating a hardware structure of the electronic device in which the blockchain-based transaction processing apparatus is located. In addition to a processor, a memory, a network interface, and a nonvolatile memory shown in FIG. 6, the electronic device in which the apparatus is located in some embodiments usually can include other hardware based on an actual function of the electronic device. Details are omitted here for simplicity.

Figure 7:
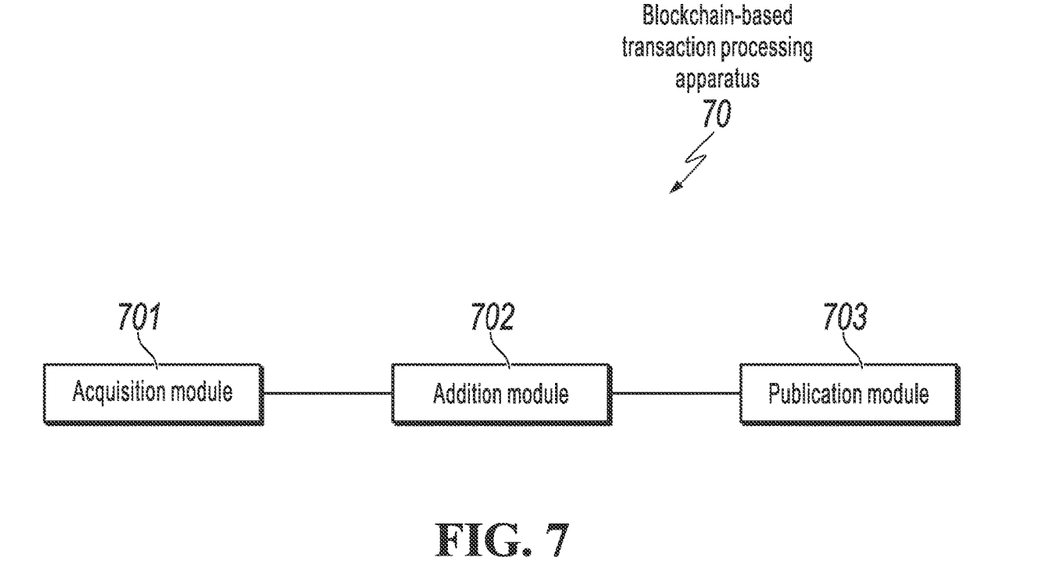
FIG. 7 is a block diagram illustrating a blockchain-based transaction processing apparatus, according to an example embodiment.

FIG. 7 is a block diagram illustrating a blockchain-based transaction processing apparatus, according to an example embodiment of the present specification.

Referring to FIG. 7, the blockchain-based transaction processing apparatus 70 can be applied to the electronic device shown in FIG. 6, and includes an acquisition module 701, an addition module 702, and a publication module 703.

The acquisition module 701 is configured to obtain, from a Nonce list that corresponds to a user account and is maintained in a blockchain, available Nonce records that include the same group identifier for a plurality of transactions that need to be concurrently executed and are initiated by a user through the user account. The Nonce list includes a plurality of Nonce records, and the Nonce record includes a group identifier and a Nonce value.

The addition module 702 is configured to respectively add the obtained available Nonce records to the plurality of transactions.

The publication module 703 is configured to publish the plurality of transactions in the blockchain, so that a node device in the blockchain matches an available Nonce record in a transaction published by the client device with the Nonce record in the Nonce list, and when the available Nonce record matches any target Nonce record in the Nonce list, processes the transaction, and concurrently executes a plurality of transactions with the same group identifier in processed transactions.

In some embodiments, the plurality of transactions that need to be concurrently executed include a plurality of transactions of the same transaction type.

In some embodiments, the acquisition module 701 is further configured to: if transactions initiated by the user through the user account include a plurality of transaction groups, and each transaction group includes a plurality of transactions that need to be concurrently executed, determine an execution order of the plurality of transaction groups; and obtain available Nonce records that include the same group identifier for each of the plurality of transaction groups from the Nonce list, where group identifiers of the plurality of transaction groups indicate the execution order of the plurality of transaction groups.

In some embodiments, the acquisition module 701 is further configured to: before obtaining, from the Nonce list, the available Nonce records that include the same group identifier for the plurality of transactions that need to be concurrently executed and are initiated by the user through the user account, in response to an initialization instruction for the client device, obtain the Nonce list maintained in the blockchain, and maintain the obtained Nonce list on the client device; and obtain, from the Nonce list maintained on the client device, the available Nonce records that include the same group identifier for the plurality of transactions that need to be concurrently executed and are initiated by the user through the user account.

In some embodiments, the Nonce records in the Nonce list maintained on the client device are marked as available by default; and the acquisition module 701 is configured to: mark the available Nonce records as unavailable in the Nonce list after obtaining, from the Nonce list maintained on the client device, the available Nonce records that include the same group identifier for the plurality of transactions that need to be concurrently executed and are initiated by the user through the user account.

In some embodiments, the acquisition module 701 is further configured to: determine whether a notification message indicating that the transaction is processed is received from the node device; and if yes, monotonically increase a Nonce value in the available Nonce record based on predetermined amplitude, and re-mark the available Nonce record as available in the Nonce list after monotonically increasing the Nonce value.

In some embodiments, the client device is a multi-threaded client device, and a quantity of Nonce records in the Nonce list indicates a transaction concurrency capability of the user account.

In some embodiments, the Nonce record further includes an index identifier of the Nonce record.

Figure 8:
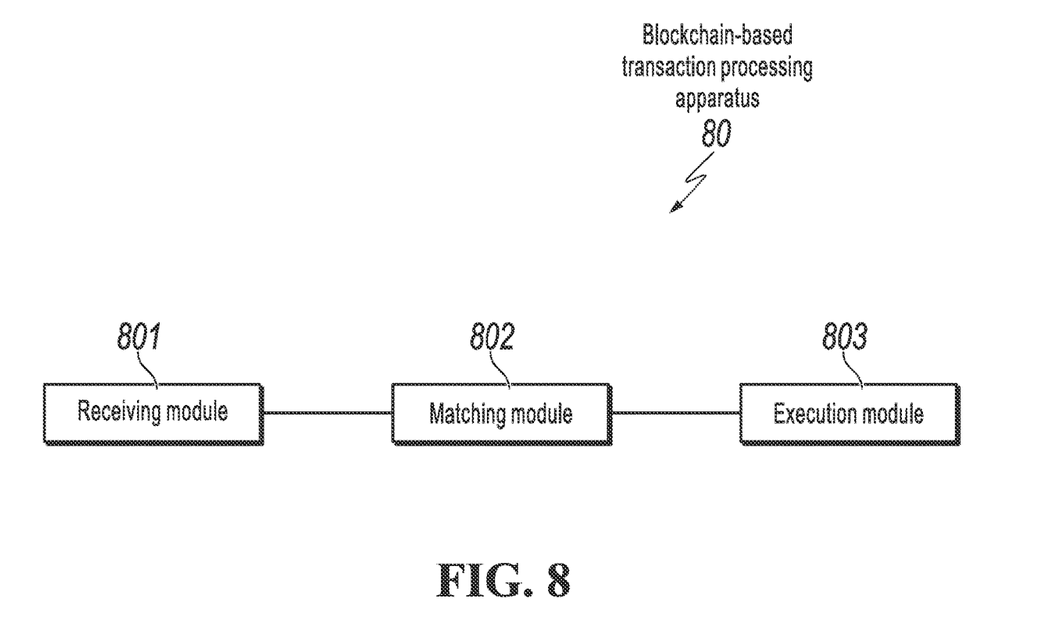
FIG. 8 is another block diagram illustrating a blockchain-based transaction processing apparatus, according to an example embodiment.

FIG. 8 is another block diagram illustrating a blockchain-based transaction processing apparatus, according to an example embodiment of the present specification.

Referring to FIG. 8, the blockchain-based transaction processing apparatus 80 can also be applied to the electronic device shown in FIG. 6, and includes a receiving module 801, a matching module 802, and an execution module 803.

The receiving module 801 is configured to receive a transaction that is initiated by a user through a user account and sent by a client device. An available Nonce record obtained from a Nonce list that corresponds to the user account and is maintained in a blockchain is added to the transaction, the Nonce list includes a plurality of Nonce records, and the Nonce record includes a group identifier and a Nonce value.

The matching module 802 is configured to match the available Nonce record in the received transaction with a Nonce record in the Nonce list that corresponds to the user account and is maintained in the blockchain.

The execution module 803 is configured to: if the available Nonce record matches any target Nonce record in the Nonce list, process the transaction, and concurrently execute a plurality of transactions with the same group identifier in processed transactions.

In some embodiments, transactions sent by the client device include a plurality of transaction groups, each transaction group includes a plurality of transactions with the same group identifier, and group identifiers in available Nonce records added by the client device to the plurality of transaction groups indicate an execution order of the plurality of transaction groups; and the execution module 803 is further configured to: if the transactions sent by the client device include the plurality of transaction groups, and each transaction group includes a plurality of transactions with the same group identifier, execute the plurality of transaction groups in the execution order indicated by the group identifiers of the plurality of transaction groups.

In some embodiments, the execution module 803 is further configured to: if the available Nonce record matches the any target Nonce record in the Nonce list, monotonically increase a Nonce value in the target Nonce record based on predetermined amplitude; and return a notification message indicating that the transaction is processed to the client device.

In some embodiments, the Nonce record further includes an index identifier of the Nonce record.

For specific implementation processes of functions of the modules in the apparatus, references can be made to the implementation processes of the corresponding steps in the method. Details are omitted here for simplicity.

The apparatus embodiments basically correspond to the method embodiments. Therefore, for related parts, references can be made to partial description in the method embodiments. The previously described apparatus embodiments are merely examples. The modules described as separate parts can be or do not have to be physically separate, and parts displayed as modules can be or do not have to be physical modules, can be located in one place, or can be distributed on a plurality of network modules. Some or all of these modules can be selected based on actual needs to achieve the objective of the technical solutions of the present specification. A person of ordinary skill in the art can understand and implement the present specification without creative efforts.

The system, apparatus, or module illustrated in the previously described embodiments can be specifically implemented by a computer chip or an entity, or can be implemented by a product having a certain function. A typical implementation device is a computer. Specific forms of the computer can include a personal computer, a laptop computer, a cellular phone, a camera phone, a smartphone, a personal digital assistant, a media player, a navigation device, an e-mail transceiver, a game console, a tablet computer, a wearable device, or any combination of several of these devices.

Corresponding to the previously described method embodiments, the present specification further provides embodiments of an electronic device. The electronic device includes a processor and a memory, configured to store a machine-executable instruction. The processor and the memory are usually connected to each other through an internal bus. In other possible embodiments, the device can further include an external interface to enable the device to communicate with other devices or parts.

In some embodiments, by reading and executing the machine-executable instruction that is stored in the memory and corresponds to blockchain-based transaction processing control logic, the processor is promoted to perform the following operations: obtaining, from a Nonce list that corresponds to a user account and is maintained in a blockchain, available Nonce records that include the same group identifier for a plurality of transactions that need to be concurrently executed and are initiated by a user through the user account, where the Nonce list includes a plurality of Nonce records, and the Nonce record includes a group identifier and a Nonce value; respectively adding the obtained available Nonce records to the plurality of transactions; and publishing the plurality of transactions in the blockchain, so that a node device in the blockchain matches an available Nonce record in a transaction published by the client device with the Nonce record in the Nonce list, and when the available Nonce record matches any target Nonce record in the Nonce list, processes the transaction, and concurrently executes a plurality of transactions with the same group identifier in processed transactions.

In some embodiments, by reading and executing the machine-executable instruction that is stored in the memory and corresponds to the blockchain-based transaction processing control logic, the processor is promoted to perform the following operations: if transactions initiated by the user through the user account include a plurality of transaction groups, and each transaction group includes a plurality of transactions that need to be concurrently executed, determining an execution order of the plurality of transaction groups; and obtaining available Nonce records that include the same group identifier for each of the plurality of transaction groups from the Nonce list, where group identifiers of the plurality of transaction groups indicate the execution order of the plurality of transaction groups.

In some embodiments, by reading and executing the machine-executable instruction that is stored in the memory and corresponds to the blockchain-based transaction processing control logic, the processor is promoted to perform the following operations: before obtaining, from the Nonce list, the available Nonce records that include the same group identifier for the plurality of transactions that need to be concurrently executed and are initiated by the user through the user account, in response to an initialization instruction for the client device, obtaining the Nonce list maintained in the blockchain, and maintaining the obtained Nonce list on the client device; and obtaining, from the Nonce list maintained on the client device, the available Nonce records that include the same group identifier for the plurality of transactions that need to be concurrently executed and are initiated by the user through the user account.

In some embodiments, the Nonce records in the Nonce list maintained on the client device are marked as available by default; and by reading and executing the machine-executable instruction that is stored in the memory and corresponds to the blockchain-based transaction processing control logic, the processor is promoted to perform the following operations: marking the available Nonce records as unavailable in the Nonce list after obtaining, from the Nonce list maintained on the client device, the available Nonce records that include the same group identifier for the plurality of transactions that need to be concurrently executed and are initiated by the user through the user account.

In some embodiments, by reading and executing the machine-executable instruction that is stored in the memory and corresponds to the blockchain-based transaction processing control logic, the processor is promoted to perform the following operations: determining whether a notification message indicating that the transaction is processed is received from the node device; and if yes, monotonically increasing a Nonce value in the available Nonce record based on predetermined amplitude, and re-marking the available Nonce record as available in the Nonce list after monotonically increasing the Nonce value.

Corresponding to the method embodiments, the present specification further provides embodiments of an electronic device. The electronic device includes a processor and a memory, configured to store a machine-executable instruction. The processor and the memory are usually connected to each other through an internal bus. In other possible embodiments, the device can further include an external interface to enable the device to communicate with other devices or parts.

In some embodiments, by reading and executing the machine-executable instruction that is stored in the memory and corresponds to blockchain-based transaction processing control logic, the processor is promoted to perform the following operations: receiving a transaction that is initiated by a user through a user account and sent by a client device, where an available Nonce record obtained from a Nonce list that corresponds to the user account and is maintained in a blockchain is added to the transaction, the Nonce list includes a plurality of Nonce records, and the Nonce record includes a group identifier and a Nonce value; matching the available Nonce record in the received transaction with a Nonce record in the Nonce list that corresponds to the user account and is maintained in the blockchain; and if the available Nonce record matches any target Nonce record in the Nonce list, processing the transaction, and concurrently executing a plurality of transactions with the same group identifier in processed transactions.

In some embodiments, transactions sent by the client device include a plurality of transaction groups, each transaction group includes a plurality of transactions with the same group identifier, and group identifiers in available Nonce records added by the client device to the plurality of transaction groups indicate an execution order of the plurality of transaction groups; and by reading and executing the machine-executable instruction that is stored in the memory and corresponds to the blockchain-based transaction processing control logic, the processor is promoted to perform the following operations: if the transactions sent by the client device include the plurality of transaction groups, and each transaction group includes a plurality of transactions with the same group identifier, executing the plurality of transaction groups in the execution order indicated by the group identifiers of the plurality of transaction groups.

In some embodiments, by reading and executing the machine-executable instruction that is stored in the memory and corresponds to the blockchain-based transaction processing control logic, the processor is promoted to perform the following operations: if the available Nonce record matches the any target Nonce record in the Nonce list, monotonically increasing a Nonce value in the target Nonce record based on predetermined amplitude; and returning a notification message indicating that the transaction is processed to the client device.

A person skilled in the art can easily figure out another implementation solution of the present specification after considering the specification and practicing the present invention disclosed here. The present specification is intended to cover any variations, uses, or adaptive changes of the present specification. These variations, uses, or adaptive changes follow general principles of the present specification, and include common knowledge or a commonly used technical means that are not disclosed in the technical field of the present specification. The present specification and the embodiments are merely considered as examples, and the actual scope and spirit of the present specification are pointed out by the following claims.

It should be understood that the present specification is not limited to the precise structures that have been described above and shown in the accompanying drawings, and various modifications and changes can be made without departing from the scope of the present specification. The scope of the present specification is limited only by the appended claims.

The previous descriptions are merely preferred embodiments of the present specification, and are not intended to limit the present specification. Any modification, equivalent replacement, or improvement made without departing from the spirit and principle of the present specification shall fall within the protection scope of the present specification.

What is claimed is:

1. A computer-implemented method, comprising:
   receiving, by a client device, an initialization instruction in advance of a transaction initiated by a user through a user account;
   in response to the initialization instruction, establishing a connection by the client device with a node device in a block chain and obtaining, by the client device, a Nonce list corresponding to the user account and that is maintained in a blockchain, the Nonce list comprising a plurality of Nonce records, each Nonce record comprising a composite structure including a group identifier indicating a group to which a transaction belongs, a Nonce value associated with the user account, and an index identifier indicating a rank of the Nonce record among the plurality of Nonce records in the Nonce list based upon the Nonce value;
   storing, by the client device, the Nonce list on the client device as a locally saved Nonce list, wherein the locally saved Nonce list is maintained by the client device;
   after storing the Nonce list on the client device as the locally saved Nonce list, receiving, by the client device, a plurality of transactions initiated by a user through a user account, wherein the plurality of transactions need to be concurrently executed;
   in response, accessing, by the client device, the locally saved Nonce list without exchanging data with the node device from which the Nonce list was obtained;
   obtaining, by the client device, from the locally saved Nonce list, available Nonce records that comprise a same group identifier for the plurality of transactions, wherein each available Nonce record is for a respective transaction of the plurality of transactions;
   respectively adding, by the client device, the available Nonce records to the plurality of transactions; and publishing, by the client device, the plurality of transactions in the blockchain, so that for each available record, a node device in the blockchain matches the available Nonce record in a corresponding transaction published by the client device with the Nonce records in the Nonce list maintained in the blockchain, and when the available Nonce record matches a target Nonce record in the Nonce list maintained in the blockchain, the node device processes the corresponding transaction, and concurrently executes a plurality of the processed transactions with the same group identifier.

2. The computer-implemented method of claim 1, wherein the plurality of transactions that need to be concurrently executed comprise a plurality of transactions of a same transaction type.

3. The computer-implemented method of claim 1, further comprising:
in response to the plurality of transactions initiated by the user through the user account comprise a plurality of transaction groups, and each transaction group comprises a plurality of transactions that need to be concurrently executed, determining an execution order of the plurality of transaction groups; and
respectively obtaining the available Nonce records that comprise the same group identifier for each of the plurality of transaction groups from the locally saved Nonce list, wherein group identifiers of the plurality of transaction groups indicate the execution order of the plurality of transaction groups.

4. The computer-implemented method of claim 1, wherein the Nonce records in the locally saved Nonce list maintained on the client device are marked as available by default, and the method further comprises:
marking the available Nonce records as unavailable in the locally saved Nonce list after obtaining, from the locally saved Nonce list maintained on the client device, the available Nonce records that comprise the same group identifier for the plurality of transactions that need to be concurrently executed and are initiated by the user through the user account.

5. The computer-implemented method of claim 4, further comprising:
determining that a notification message indicating that a transaction is processed is received from the node device; and
in response, monotonically increasing the Nonce value in the available Nonce record in the locally saved Nonce list maintained on the client device based on a predetermined amplitude; and
re-marking the available Nonce record as available in the locally saved Nonce list maintained on the client device.

6. The computer-implemented method of claim 1, wherein the client device is a multi-threaded client device, and a quantity of Nonce records in the Nonce list maintained in a blockchain indicates a transaction concurrency capability of the user account.

7. The computer-implemented method of claim 1, comprising updating, by the client device, based upon the adding the available Nonce records to the plurality of transactions, the available Nonce records as updated Nonce records,
wherein each updated Nonce record further comprises an availability indicator of the available Nonce record in the locally saved Nonce list.

8. A non-transitory, computer-readable medium storing one or more instructions executable by a computer system and that upon execution cause the computer system to perform operations comprising:
receiving, by a client device, an initialization instruction in advance of a transaction initiated by a user through a user account;
in response to the initialization instruction, establishing a connection by the client device with a node device in a block chain and obtaining, by the client device, a Nonce list corresponding to the user account and that is maintained in a blockchain, the Nonce list comprising a plurality of Nonce records, each Nonce record comprising a composite structure including a group identifier indicating a group to which a transaction belongs, a Nonce value associated with the user account, and an index identifier indicating a rank of the Nonce record among the plurality of Nonce records in the Nonce list based upon the Nonce value;
storing, by the client device, the Nonce list on the client device as a locally saved Nonce list, wherein the locally saved Nonce list is maintained by the client device;
after storing the Nonce list on the client device as the locally saved Nonce list, receiving, by the client device, a plurality of transactions initiated by a user through a user account, wherein the plurality of transactions need to be concurrently executed;
in response, accessing, by the client device, the locally saved Nonce list without exchanging data with the node device from which the Nonce list was obtained;
obtaining, by the client device, from the locally saved Nonce list, available Nonce records that comprise a same group identifier for the plurality of transactions, wherein each available Nonce record is for a respective transaction of the plurality of transactions;
respectively adding, by the client device, the available Nonce records to the plurality of transactions; and
publishing, by the client device, the plurality of transactions in the blockchain, so that for each available record, a node device in the blockchain matches the available Nonce record in a corresponding transaction published by the client device with the Nonce records in the Nonce list maintained in the blockchain, and when the available Nonce record matches a target Nonce record in the Nonce list maintained in the blockchain, the node device processes the corresponding transaction, and concurrently executes a plurality of the processed transactions with the same group identifier.

9. The non-transitory, computer-readable medium of claim 8, wherein the plurality of transactions that need to be concurrently executed comprise a plurality of transactions of a same transaction type.

10. The non-transitory, computer-readable medium of claim 8, the operations further comprise:
in response to the plurality of transactions initiated by the user through the user account comprise a plurality of transaction groups, and each transaction group comprises a plurality of transactions that need to be concurrently executed, determining an execution order of the plurality of transaction groups; and
respectively obtaining the available Nonce records that comprise the same group identifier for each of the plurality of transaction groups from the locally saved Nonce list, wherein group identifiers of the plurality of transaction groups indicate the execution order of the plurality of transaction groups.

11. The non-transitory, computer-readable medium of claim 8, wherein the Nonce records in the locally saved Nonce list maintained on the client device are marked as available by default, and the operations further comprise:

marking the available Nonce records as unavailable in the locally saved Nonce list after obtaining, from the locally saved Nonce list maintained on the client device, the available Nonce records that comprise the same group identifier for the plurality of transactions that need to be concurrently executed and are initiated by the user through the user account.

12. The non-transitory, computer-readable medium of claim 11, the operations further comprise:

determining that a notification message indicating that a transaction is processed is received from the node device; and in response, monotonically increasing the Nonce value in the available Nonce record in the locally saved Nonce list maintained on the client device based on a predetermined amplitude; and re-marking the available Nonce record as available in the locally saved Nonce list maintained on the client device.

13. The non-transitory, computer-readable medium of claim 8, wherein the client device is a multi-threaded client device, and a quantity of Nonce records in the Nonce list maintained in a blockchain indicates a transaction concurrency capability of the user account.

14. A computer-implemented system, comprising:

one or more computers; and one or more computer memory devices interoperably coupled with the one or more computers and having tangible, non-transitory, machine-readable media storing one or more instructions that, when executed by the one or more computers, cause the one or more computers to perform operations comprising:

receiving, by a client device, an initialization instruction in advance of a transaction initiated by a user through a user account;

in response to the initialization instruction, establishing a connection by the client device with a node device in a block chain and obtaining, by the client device, a Nonce list corresponding to the user account and that is maintained in a blockchain, the Nonce list comprising a plurality of Nonce records, each Nonce record comprising a composite structure including a group identifier indicating a group to which a transaction belongs, a Nonce value associated with the user account, and an index identifier indicating a rank of the Nonce record among the plurality of Nonce records in the Nonce list based upon the Nonce value;

storing, by the client device, the Nonce list on the client device as a locally saved Nonce list, wherein the locally saved Nonce list is maintained by the client device;

after storing the Nonce list on the client device as the locally saved Nonce list, receiving, by the client device, a plurality of transactions initiated by a user through a user account, wherein the plurality of transactions need to be concurrently executed;

in response, accessing, by the client device, the locally saved Nonce list without exchanging data with the node device from which the Nonce list was obtained;

obtaining, by the client device, from the locally saved Nonce list, available Nonce records that comprise a same group identifier for the plurality of transactions, wherein each available Nonce record is for a respective transaction of the plurality of transactions;

respectively adding, by the client device, the available Nonce records to the plurality of transactions; and publishing, by the client device, the plurality of transactions in the blockchain, so that for each available record, a node device in the blockchain matches the available Nonce record in a corresponding transaction published by the client device with the Nonce records in the Nonce list maintained in the blockchain, and when the available Nonce record matches a target Nonce record in the Nonce list maintained in the blockchain, the node device processes the corresponding transaction, and concurrently executes a plurality of the processed transactions with the same group identifier.

15. The computer-implemented system of claim 14, wherein the plurality of transactions that need to be concurrently executed comprise a plurality of transactions of a same transaction type.

16. The computer-implemented system of claim 14, the operations further comprise:

in response to the plurality of transactions initiated by the user through the user account comprise a plurality of transaction groups, and each transaction group comprises a plurality of transactions that need to be concurrently executed, determining an execution order of the plurality of transaction groups; and respectively obtaining the available Nonce records that comprise the same group identifier for each of the plurality of transaction groups from the locally saved Nonce list, wherein group identifiers of the plurality of transaction groups indicate the execution order of the plurality of transaction groups.

17. The non-transitory, computer-readable medium of claim 8, comprising updating, by the client device, based upon the adding the available Nonce records to the plurality of transactions, the available Nonce records as updated Nonce records, wherein each updated Nonce record further comprises an availability indicator of the available Nonce record in the locally saved Nonce list.

* * * * *

UNITED STATES PATENT AND TRADEMARK OFFICE
CERTIFICATE OF CORRECTION

PATENT NO. : 11,481,765 B2
APPLICATION NO. : 17/160203
DATED : October 25, 2022
INVENTOR(S) : Wang et al.

It is certified that error appears in the above-identified patent and that said Letters Patent is hereby corrected as shown below:

In the Claims

Column 20, Claim 1, Line 40, replace "block chain" with -- blockchain --; and
Column 20, Claim 1, Line 42, replace "a" with -- the --.

Column 22, Claim 8, Line 8, replace "block chain" with -- blockchain --; and
Column 22, Claim 8, Line 10, replace "a" with -- the --.

Column 23, Claim 14, Line 40, replace "block chain" with -- blockchain --; and
Column 23, Claim 14, Line 42, replace "a" with -- the --.

Signed and Sealed this
Twenty-eighth Day of March, 2023

Katherine Kelly Vidal
*Director of the United States Patent and Trademark Office*